(12) United States Patent
Nakano et al.

(10) Patent No.: US 6,454,070 B1
(45) Date of Patent: Sep. 24, 2002

(54) DRAIN MECHANISM FOR HYDRAULIC POWER TRANSMISSION JOINT

(75) Inventors: Hiroyuki Nakano, Shizuoka (JP); Tadahiko Kato, Shizuoka (JP); Akira Nakabayashi, Shizuoka (JP); Toshiharu Takasaki, Kanagawa (JP); Hirotaka Kusukawa, Machida (JP); Shigeo Murata, Kanagawa (JP)

(73) Assignees: Fujiunivance Co., Shizouka (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/571,356

(22) Filed: May 15, 2000

(30) Foreign Application Priority Data

May 17, 1999 (JP) .......................................... 11-135451

(51) Int. Cl.[7] ................................................ F16D 31/02
(52) U.S. Cl. ..................... 192/59; 192/82 T; 192/103 F; 464/27
(58) Field of Search .............................. 192/59, 103 F, 192/82 T, 54.3; 464/24, 27; 60/487; 91/485, 499

(56) References Cited

U.S. PATENT DOCUMENTS

| | | | |
|---|---|---|---|
| 4,745,746 A | | 5/1988 | Geringer |
| 5,037,353 A | * | 8/1991 | Suzuki et al. .................. 464/27 |
| 5,103,642 A | * | 4/1992 | Suzuki et al. .............. 192/59 X |
| 5,595,214 A | | 1/1997 | Schaffer et al. |
| 5,706,658 A | * | 1/1998 | Kato et al. ..................... 60/487 |
| 5,983,635 A | * | 11/1999 | Kato et al. ..................... 60/487 |

FOREIGN PATENT DOCUMENTS

| | | | |
|---|---|---|---|
| EP | 1 054 176 A2 | * | 11/2000 |
| EP | 1 055 836 A2 | * | 11/2000 |
| JP | 4-83920 A | * | 3/1992 |
| JP | 2000-310246 A | * | 11/2000 |
| JP | 2000-337402 A | * | 12/2000 |

* cited by examiner

*Primary Examiner*—Richard M. Lorence
(74) *Attorney, Agent, or Firm*—Wenderoth, Lind & Ponack, L.L.P.

(57) ABSTRACT

A limiter plug and a drain plug are juxtaposed in a valve block. The limiter plug is provided with a thermo-switch of which operation, when a predetermined temperature is reached, opens a communication passage for drainage by means of a limiter pin. The drain plug is provided with a drain pin for draining a high-pressure oil in conjunction with the drainage action of the limit pin induced by the thermo-switch so that, when the predetermined temperature is reached, it substantially nullifies the torque for switching from 4 wheel-drive to 2 wheel-drive. In the status of no operation of the thermo-switch, the drain pin when a predetermined torque is reached, gradually opens the drain hole while catching a balance, to limit the torque to a predetermined value.

5 Claims, 9 Drawing Sheets

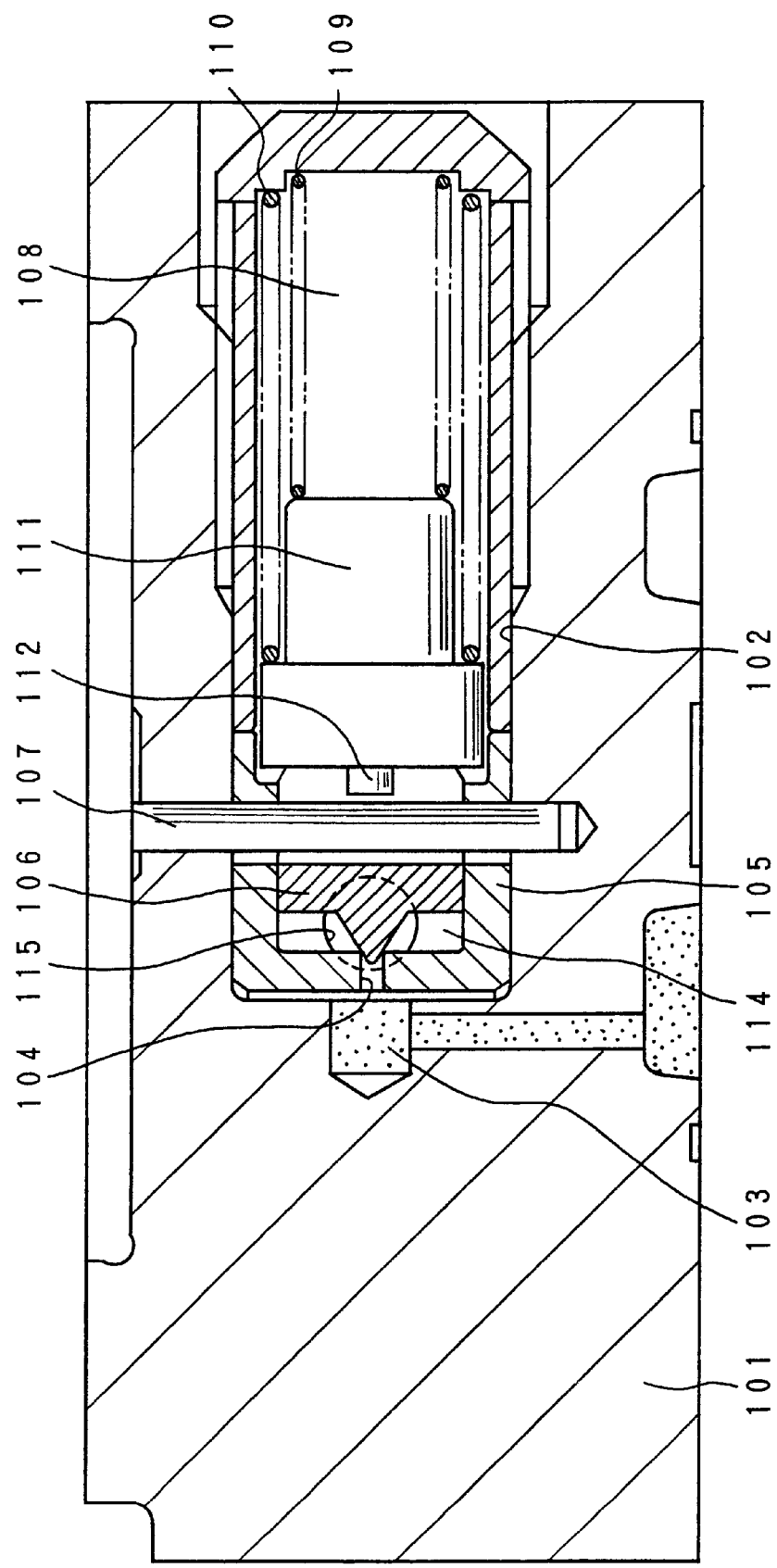

DRAIN MECHANISM FOR HYDRAULIC POWER TRANSMISSION JOINT

BACKGROUND OF THE INVENTION

1. Field of the Invention

The present invention relates generally to a drain mechanism for a hydraulic power transmission joint for use in 4 wheel-drive mechanisms for motor vehicles, and more particularly to a drain mechanism for a hydraulic power transmission joint, serving both as a temperature-based 2 wheel-drive switching mechanism and a torque limiter mechanism.

2. Description of the Related Arts

Such a hydraulic power transmission joint for use in an automobile 4 wheel-drive mechanism is hitherto known from U.S. Pat. Nos. 5,706,658 and 5,983,635.

FIG. 1A illustrates an exemplary drain mechanism for use with a hydraulic power transmission joint being currently developed by the present inventors on the basis of such U.S. Patents. A rotor is provided in the hydraulic power transmission joint for transmitting torque as a function of the rotational-speed difference between an input shaft and an output shaft, the rotor being provided with a valve block 101 that rotates jointly with the rotor. The rotor is linked to a main shaft coupled to rear wheels, for integral rotation with the main shaft. The valve block 101 is formed with an accommodation hole 102 that accommodates a drain plug 105 having a drain hole 104 through which hydraulic pressure from a high-pressure chamber 103 is discharged. Within the drain plug 105 there is slidably provided a drain pin 106 for opening and closing the drain hole 104. A fixed pin 107 is fixedly inserted into the valve block 101 for restricting the displacement of the drain pin 106. A low-pressure chamber 108 is formed in the accommodation hole 102 of the valve block 101. Within the low-pressure chamber 108 is provided a thermo-switch 111 that is urged by return springs 109 and 110 to press the drain pin 106 so as to block the drain hole 104. The thermo-switch 111 is provided with a head pin 112 that protrudes outward when a predetermined temperature is reached. In the status where the predetermined temperature is not reached for operation, the thermo-switch presses the drain pin 106 leftward with the aid of the return springs 109 and 110 as shown in FIG. 1A, to block the drain hole 104. At that time, the head pin 112 of the thermo-switch 111 does not abut against the fixed pin 107 with a minute gap therebetween. When the predetermined temperature is reached, the head pin 112 of the thermo-switch 111 is extended leftward as shown in FIG. 1B to abut against the fixed pin 107, with the resultant reaction force causing the thermo-switch 111 to retreat rightward against the biasing forces of the return springs 109 and 110. When the thermo-switch 111 retreats rightward, the force pressing the drain pin 106 is cut off, to release the drain pin 106 which in turn is displaced rightward by a high pressure from the high-pressure chamber 103 to open the drain hole 104. As a result of this, oil within the high-pressure chamber 103 flows through the drain hole 104 and via a drain chamber 114 into a drain passage 115 as indicated by the arrow.

That is, when the drain pin 106 retreats to open the drain hole 104 as shown in FIG. 2B from the status of FIG. 2A in which the drain hole 104 is blocked by the drain pin 106, oil within the high-pressure chamber 103 flows through the drain hole 104 into the drain chamber 114, and thence is drained through the drain passage 115 into the low-pressure chamber as indicated by the arrow. A further displacement of the drain pin 106 is prevented by the abutment of the bottom of a recessed portion 113 of the drain pin 106 against the fixed pin 107 as shown in FIG. 2B.

FIG. 3 illustrates torque characteristics in which characteristic A is obtained when the temperature of oil is below a predetermined level prior to the operation of the drain pin 106, with the acquisition of the torque $\Delta T$ being proportional to the square of the rotational-speed difference. In contrast to this, characteristic B is a torque characteristic obtained after the predetermined temperature has been exceeded for the operation of the drain pin 106, in which the torque $\Delta T$ continues to increase accordingly as the rotational-speed difference $\Delta N$ increase since the drain capability runs short due to the smaller diameter of the drain hole 104.

However, in such a conventional drain mechanism for the hydraulic power transmission joint, the drain hole had a reduced diameter to form an orifice, which allows the hydraulic pressure to be set to a higher level but which is apt to induce a shortage of the drain capability even after the operation of the drain pin at the temperature exceeding the predetermined level, whereupon the torque still continues to increase with the increase of the rotational-speed difference. Furthermore, in case of the function as the torque limiter for keeping the torque at a predetermined level after the torque level has been reached, the torque also rose with the differential rotations due to the shortage of the drain capability.

SUMMARY OF THE INVENTION

The present invention provides a drain mechanism for a hydraulic power transmission joint, capable of alleviating insufficient drain capability and of keeping a certain torque when a predetermined torque is reached, as well as serving on the basis of the temperature as a 2 wheel-drive mechanism and a torque limiter.

The present invention is directed to a drain mechanism for a hydraulic power transmission joint adapted to be interposed between an input shaft and an output shaft that are rotatable relative to each other, to transmit torque as a function of the rotational-speed difference between the input and output shafts. According to a first aspect of the present invention, the drain mechanism comprises a limiter plug accommodated within a valve block and having a communication hole through which oil is introduced from a first high-pressure chamber; a thermo-switch located within a low-pressure chamber in the valve block in such a manner as to be urged by a return spring, the thermo-switch having a head pin that protrudes when a predetermined temperature is reached; a fixed pin fixedly inserted into the valve block, the fixed pin being positioned so as to allow the head pin of the thermo-switch urged by the return spring to abut thereagainst, the fixed pin when the head pin protrudes at the predetermined temperature causing the thermo-switch to retreat against the return spring; a limiter pin slidably located within the limiter plug, the limiter pin being pressed by the thermo-switch to close the communication hole for the duration in which the predetermined temperature is not reached, the limiter pin when the predetermined temperature is reached, opening the communication hole as a result of cutoff of the pressing force induced by a retreat of the thermo-switch, the limiter pin when a predetermined torque is reached, opening the communication hole by a high pressure from the first high-pressure chamber; a drain plug that follows the limiter plug, accommodated in the valve block, the drain plug having a drain hole through which oil is discharged from a second high-pressure chamber; and a drain pin slidably located within the drain plug in such a manner as to be urged by a drain spring, the drain pin having the first high-pressure chamber into which oil is introduced from the second high-pressure chamber and which opens to the communication hole, the drain pin closing the drain hole by means of a pressing force of the limiter pin until a predetermined temperature is reached, the drain pin rapidly opening the drain hole in response to a retreat of the limiter pin effected when the predetermined temperature is reached, the drain pin when a predetermined torque is reached for the duration in which the predetermined temperature is not yet reached, opening the drain hole while adjusting its balance so as to keep the predetermined torque.

Herein, the drain pin includes an orifice by way of which the first high-pressure chamber located in the interior of the drain pin can communicate with the low pressure side located in the exterior thereof. Furthermore, it functions also as a torque limiter by reducing the difference between the pressure receiving area associated with the second high-pressure chamber of the drain pin and the pressure receiving area associated with the first high-pressure chamber in the status where a predetermined temperature is not yet reached and the thermo-switch is out of action. The ratio of area of the pressure receiving area associated with the first high-pressure chamber of the drain pin to the pressure receiving area associated with the second high-pressure chamber is 1.1 or less for example.

According to a second aspect of the present invention there is provided a drain mechanism as described above, wherein the hydraulic power transmission joint comprises a housing coupled to the input shaft and having a cam face formed on its inner side surface; a rotor coupled to the output shaft and being rotatably accommodated in the housing, the rotor having a plurality of axially extending plunger chambers; a plurality of plungers each being reciprocatively accommodated in each of the plurality of plunger chambers under a biasing force of the return spring, the plurality of plungers being operated by the cam face upon the relative rotations of the input and output shafts; and a discharge hole formed in the rotor and opening to the plurality of plunger chambers; wherein the valve block is coupled to the rotor so that oil discharged by the operation of the plungers induces a reaction force in the plungers due to a flow resistance upon the passage through an orifice provided in the valve block, to thereby transmit torque between the housing and the rotor.

According to the thus constructed drain mechanism of the present invention, it is prevented that even though the predetermined temperature has been reached, the torque continues to increase accordingly as the rotational-speed difference increases, due to the insufficient drain capability, to thereby securely eliminate the torque. Furthermore, in the status where the predetermined temperature is not yet reached, the drain pin itself can operate, on the basis of the hydraulic balance, in response to the rise of torque, thereby enabling the torque to be kept at a certain level. This allows the temperature-rise based 4 wheel-drive to 2 wheel-drive mechanism and the torque limiter mechanism to be implemented together. As a result, it is possible to prevent any abnormal rise in temperature of the joint and to reduce the weight of the entire power train due to its ability to cut off the peak torque upon abrupt start or the like. In addition, by virtue of the formation of the orifice within the drain pin to allow the second high-pressure chamber and the first high-pressure chamber at the low pressure side to communicate with each other, the construction of the orifice mechanism can be simplified.

The above and other objects, aspects, features and advantages of the present invention will become more apparent from the following detailed description when read in conjunction with the accompanying drawings.

BRIEF DESCRIPTION OF THE DRAWINGS

FIGS. 1A and 1B are sectional views of a drain mechanism being currently developed by the present inventors;

DETAILED DESCRIPTION OF THE PREFERRED EMBODIMENT

Figure 4:
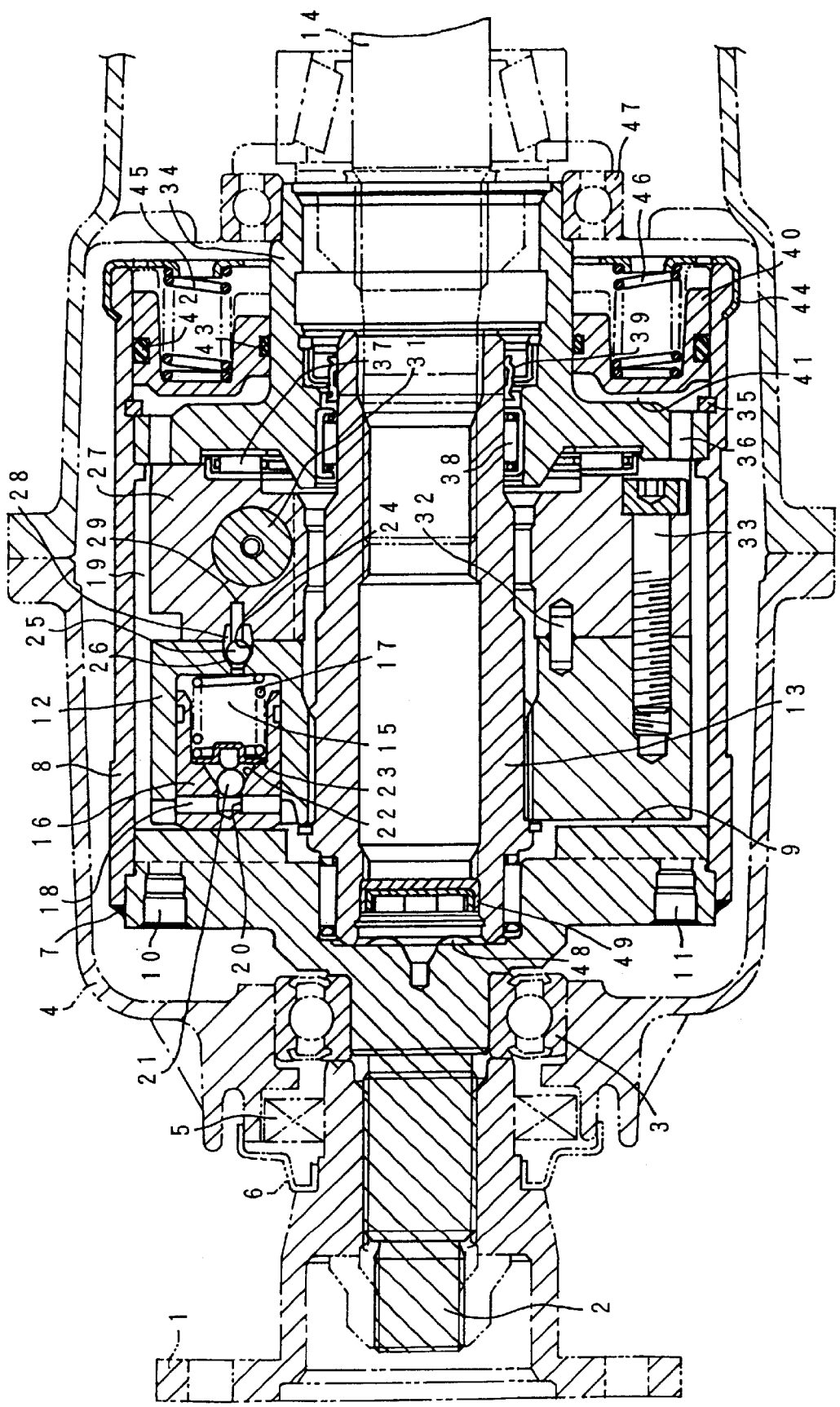
FIG. 4 is a sectional view of a hydraulic power transmission joint employing a drain mechanism in accordance with the present invention.

FIG. 4 is a sectional view of a hydraulic power transmission joint employing a drain mechanism in accordance with the present invention. A companion flange 1 is coupled to a propeller shaft (not shown) acting as a front wheel driving shaft. A cam housing shank 2 is inserted into the companion flange 1 for spline coupling. The cam housing shank 2 has on its outer periphery a front bearing 3 by way of which the cam housing shank 2 is supported on a differential gear case 4. Between the differential gear case 4 and the companion flange 1 there are provided a seal member 5 and a cover 6 that prevent in cooperation entry of foreign particles and outflow of differential gear oil. A housing 8 is secured at a weld 7 to the left side of the cam housing shank 2. On its inner side surface, the cam housing shank 2 is provided with a cam face 9 having two or more raised portions. Plugs 10 and 11 are inserted into the cam housing shank 2, for allowing oil to be injected into the interior of the joint or discharged therefrom. A rotor 12 is rotatably accommodated in the housing 8 and is engaged with a main shaft 13 for integral rotation therewith. A drive pinion gear 14 of a rear differential gear is fixedly inserted into the interior of the main shaft 13 from the right side so that driving torque is transmitted to the rear wheels by way of the rear differential gear. The rotor 12 is formed with a plurality of axially extending plunger chambers 15, each of which houses a plunger 16 slidably by way of a return spring 17. An intake passage 18 is formed in the plunger 16 at its head side that communicates with a low-pressure chamber 19. The intake passage 18 opens to the plunger chamber 15 by way of a communication hole 20 that is opened or closed by a one-way valve 21 for intake in the form of a ball. The interior of the plunger chamber 15 is formed with a valve seat 22 on which the one-way valve 21 is seated. A check plug 23 is disposed at the stepped portion of the valve seat 22. Between the check plug 23 and the one-way valve 21 there is interposed a check spring (not shown) that serves to urge the one-way valve 21 for positioning. The return spring 17 intervenes between the check plug 23 and the bottom of the rotor 12. A discharge hole 24 is formed in the rotor 12 so as to open to the plunger chamber 15. A one-way valve 25 for discharge in the form of a ball is disposed in the discharge hole 24. The discharge hole 24 is formed with a valve seat 26 on which the one-way valve 25 is seated.

The rotor 12 is followed by a valve block 27 which is provided with a high-pressure chamber 28 that communicates with the discharge hole 24 of the rotor 12. A restriction member 29 projects in to the high-pressure chamber 28 for positioning the one-way valve 25 at a predetermined location. The valve block 27 is provided with an orifice member 31 having an orifice that leads to the high-pressure chamber 28. The valve block 27 and the rotor 12 are positioned relative to each other by a pin 32 and are rigidly fastened together by a bolt 33. When the plunger 16 is in its intake stroke, the one-way valve 21 for intake at the head of the plunger 16 is opened allowing oil to flow through he low-pressure chamber 19, intake passage 18 and the communication hole 20 into the plunger chamber 15. At that time, the one-way valve 25 for discharge at the discharge hole 24 of the rotor 12 is closed blocking a back flow of oil from the high-pressure chamber 28. On the contrary, when the plunger 16 is in its discharge stroke, the one-way valve 25 at the discharge side is opened allowing oil within the plunger chamber 15 to flow through the discharge hole 24 and high-pressure chamber 28 into the orifice member 31 provided in the valve block 27. At that time, the one-way valve 21 for intake is closed to prevent oil from leaking through the communication hole 20 and intake passage 18 into the low-pressure chamber 19. The valve block 27 is followed by a bearing retainer 34. The bearing retainer 34 is rigidly press fitted into the housing 8 and is positioned by a snap ring 35. The bearing retainer 34 rotates jointly with the housing 8. The bearing retainer 34 is formed with a through-hole 36 that communicates with the low-pressure chamber 19. Needle bearings 37 and 38 are interposed between the bearing retainer 34 and the valve block 27 and between the bearing retainer 34 and the main shaft 13, respectively. An oil seal 39 is also provided between the bearing retainer 34 and the main shaft 13 for the prevention of an outflow of oil. Outside the bearing retainer 34 there is slidably provided an accumulator piston 40 for absorbing oil thermal expansion and contraction, the accumulator piston 40 defining an accumulator chamber 41 that communicates with the low-pressure chamber 19 by way of the through-hole 36 in the bearing retainer 34. O-rings 42 and 43 are interposed between the accumulator piston 40 and the housing 8 and between the accumulator piston 40 and the bearing retainer 34, respectively. Return springs 45 and 46 are disposed between an accumulator retainer 44 and the bottom of the accumulator piston 40. The extended portion of the bearing retainer 34 has on its outer periphery a rear bearing 47 by way of which the bearing retainer 34 is supported by the differential gear case 4. A lubricant groove 48 and a seal member 49 are provided in the left-hand opening of the main shaft 13.

Figure 5A:
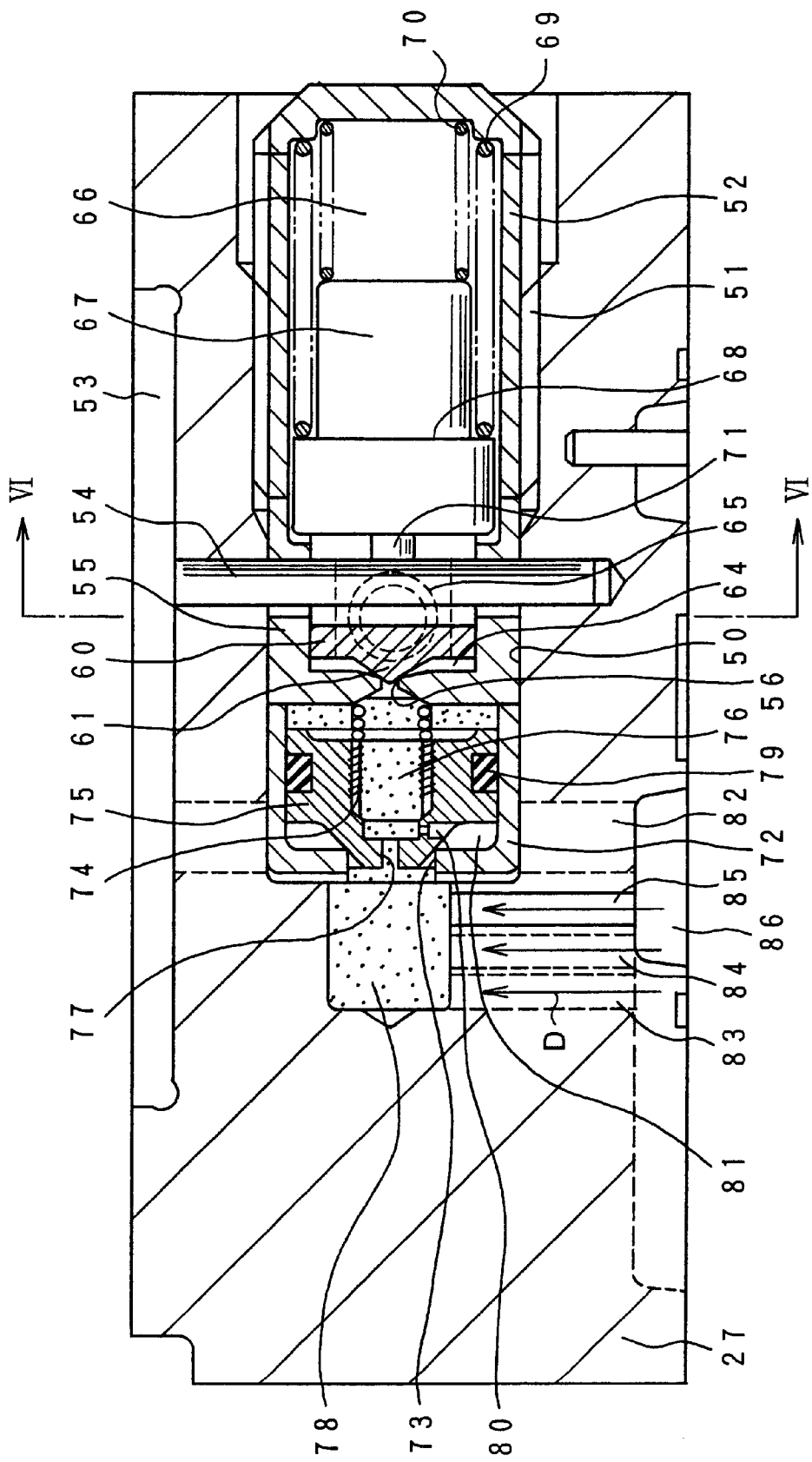
FIGS. 5A and 5B are sectional views of an embodiment of the drain mechanism in accordance with the present invention.
Figure 5B:
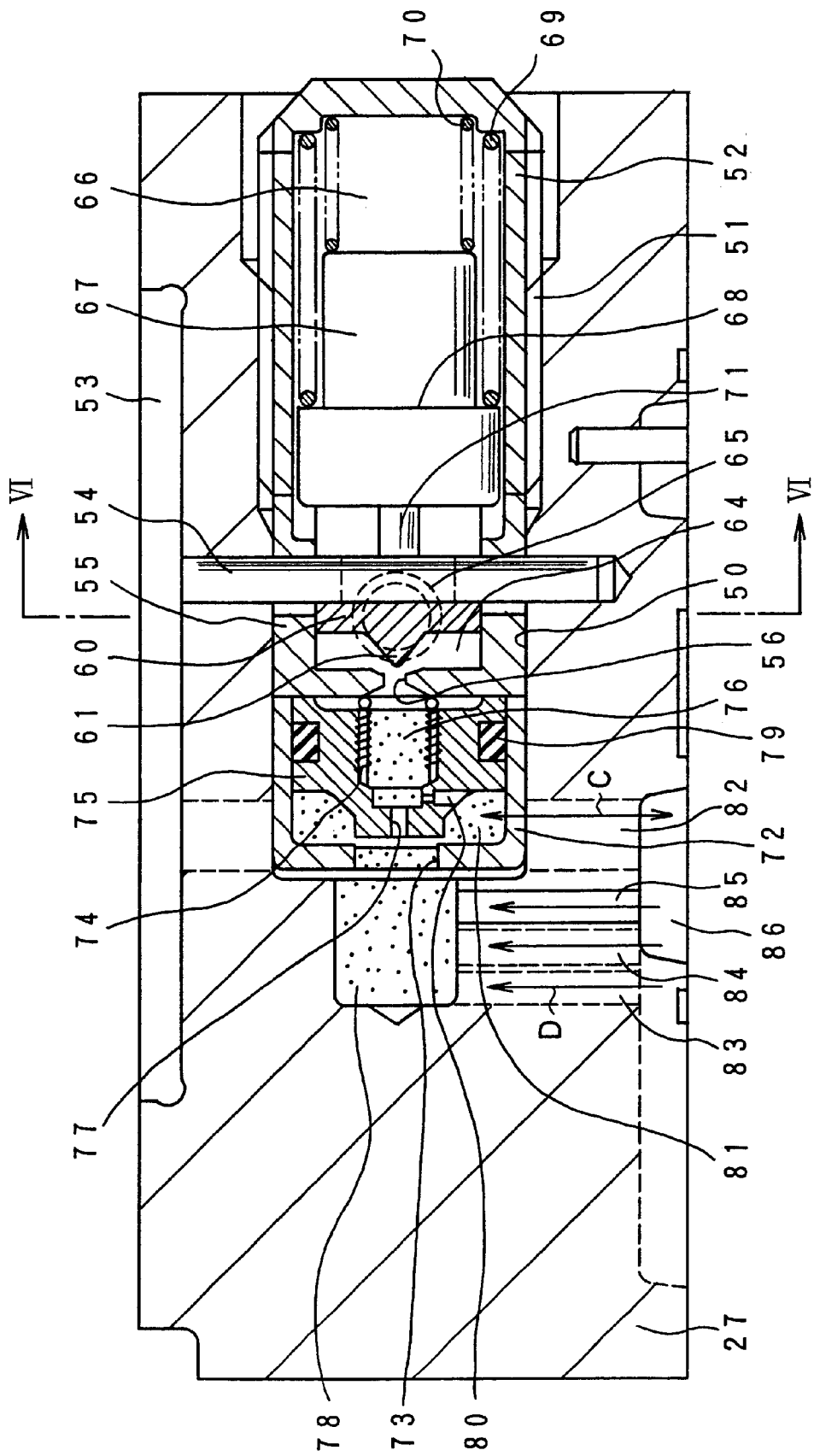
Figure 6:
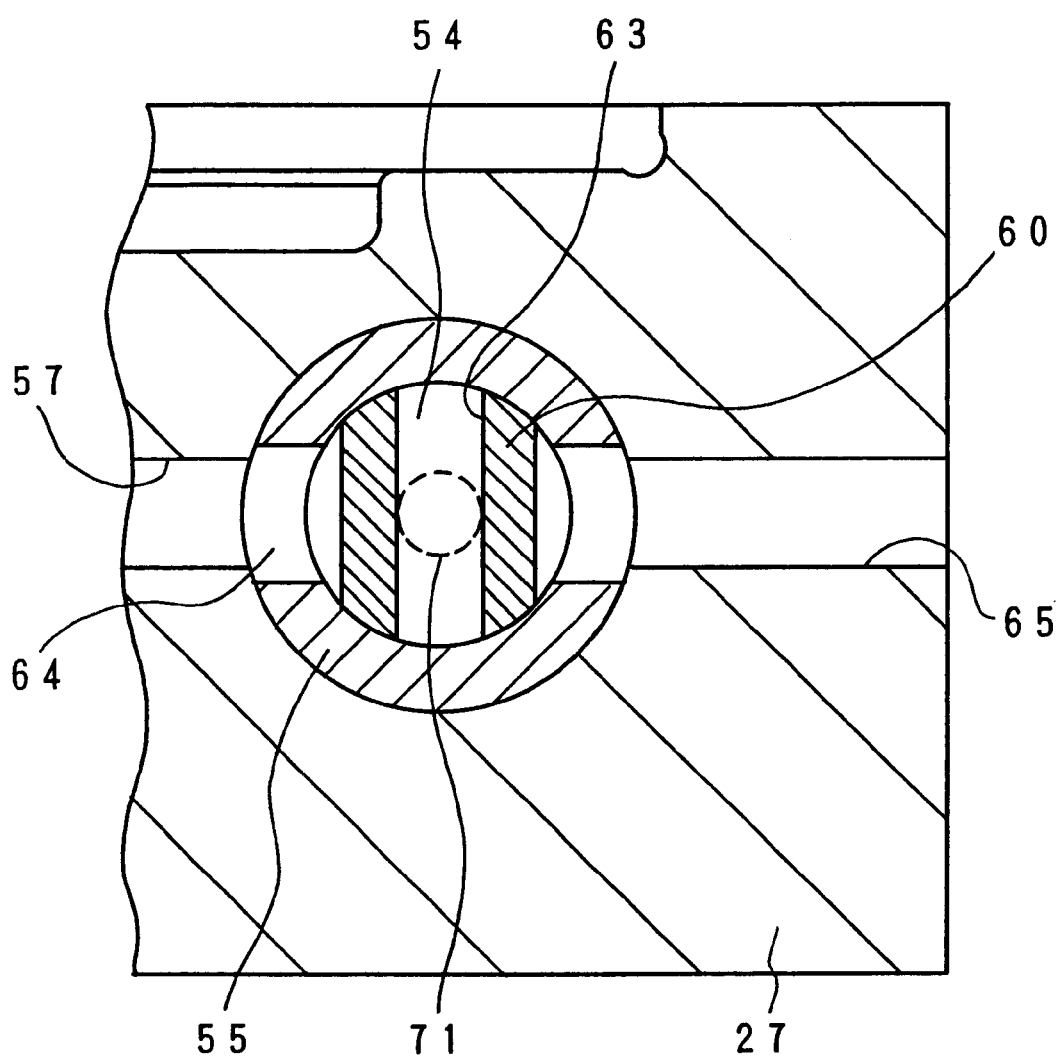
FIG. 6 is a sectional view taken along a line VI—VI of FIGS. 5A and 5B.

FIGS. 5A and 5B are sectional views of an embodiment of a drain mechanism in accordance with the present invention provided in the valve block of FIG. 4, with FIG. 5A depicting the pre-operation status, and FIG. 5B depicting the post-operation status. The valve block 27 is coupled to the rotor 12 and rotates jointly with the rotor 12. The valve block 27 includes an accommodation hole 50 that is formed with a threaded portion 51 for receiving a switch plug 52. At its upper end (right-hand end in FIG. 4), the valve block 27 is formed with a bearing seat 53 for the needle bearing 37. A fixed pin 54 is inserted from the bearing seat 53 through the accommodation hole 50 and is retained rigidly by the needle bearing 37 for the prevention of dislocation. A metallic limiter plug 55 is inserted into the accommodation hole 50. The limiter plug 55 is of a substantially cup-shaped profile that opens rearward (rightward). The limiter plug 55 is formed with a communication hole 56 that communicates with the high-pressure side. The communication hole 56 has a reduced diameter so as to allow a setting of a high pressure. A limiter pin 60 is received in the limiter plug 55 so as to be able to open and close the communication hole 56, the limiter pin 60 having a protrusion 61 for opening and closing the communication hole 56. The protrusion 61 is in the shape of a cone having a substantially triangular profile, with the tapered face of the protrusion 61 abutting against the opening end of the communication hole 56. The limiter pin 60 is open at the end opposite to the protrusion 61 and is provided with a recessed portion 63 as shown in FIG. 6 having a section taken along a line VI—VI of FIG. 5A. The fixed pin 54 is inserted through the recessed portion 63 of the limiter pin 60 in such a manner that when the limiter pin 60 is displaced to open the communication hole 56, the recessed portion 63 via its bottom is brought into abutment against the fixed pin 54 so that the displacement of the limiter pin 60 is restricted.

Referring again to FIG. 5A, a discharge hole 57 formed in the limiter plug 55 opens to a drain chamber 64 of the limiter plug 55 within which the limiter pin 60 is received, the discharge hole 57 communicating with a drain passage 65 formed in the valve block 27. After passage through the communication hole 56, oil flows through the drain chamber 64 and discharge hole 57 into the drain passage 65, after which it is drained into a low-pressure chamber. At its right side, the switch plug 52 is formed with a low-pressure chamber 66 which displaceably accommodates a thermo-switch 67.

The thermo-switch 67 has a shoulder 68 formed on its outer periphery at its rear part. A return spring 69 is interposed between the shoulder 68 and the switch plug 52, and a return spring 70 is interposed between the bottom of the thermo-switch 67 and the switch plug 52. The thermo-switch 67 is urged by the return springs 69 and 70 so as to press the limiter pin 60 leftward to thereby block the communication hole 56. The thermo-switch 67 has a head pin 71 located centrally at its fore-end in such a manner that in the pre-operation status within a predetermined temperature, a minute gap is formed between the head pin 71 and the fixed pin 54. Arrangement is such that when a predetermined temperature is reached, the head pin 71 is extended to abut against the fixed pin 54, with the resultant reaction force causing the thermo-switch 67 to retreat rightward against the return springs 69 and 70, whereupon a high-pressure from the high-pressure side causes a rightward displacement of the limiter pin 60 to open the communication hole 56. Furthermore, when a predetermined torque is exceeded, the limiter pin 60 is displaced rightward against the return springs 69 and 70, by a high pressure acting on the limiter pin 60 through the communication hole 56, to gradually open the communication hole 56.

At the bottom of the accommodation hole 50 formed in the valve block 27 there is arranged a drain plug 72 that follows the limiter plug 55. The drain plug 72 has a drain hole 73 formed in its fore-end. The drain plug 72 slidably accommodates a drain pin 75 urged by a drain spring 74. The interior of the drain pin 75 is formed with a fist high-pressure chamber 76 that leads via the communication hole 56 to the drain chamber 64 in the limiter plug 55 and that leads via a through-hole 77 formed at the fore-end to a second high-pressure chamber 78 formed in the valve block 27. The drain spring 74 is disposed within the first high-pressure chamber 76, the drain spring 74 having one end locked to the inner wall of the through-hole 77 in the drain pin 75 and having the other end locked to the limiter plug 55. An oil seal 79 is interposed between the drain pin 75 and the drain plug 72. The drain pin 75 has an orifice 80 formed therein. The orifice 80 allows a drain chamber 81 formed between the drain plug 72 and the drain pin 75 to communicate with the first high-pressure chamber 76 within the interior of the drain pin 75. The orifice 80 serves to cause the plungers to generate a reaction force by the flow resistance of oil upon the passage through the orifice 80, to thereby transmit torque between the housing and the rotor.

The drain chamber 81 opens to a drain passage 82 so that after entering the drain chamber 81, oil is drained through the drain passage 82 into the low-pressure chamber.

When oil reaches a predetermined temperature, as shown in FIG. 5B the head pin 71 of the thermo-switch 67 is extended for activation, so that the thermo-switch 67 is displaced rightward as a result of pressing the fixed pin 54, thus releasing the limiter pin 60. This causes a retreat of the limiter pin 60 against the return springs 69 and 70, to open the communication hole 56. The hydraulic pressure within the first high-pressure chamber 76 of the drain pin 75 becomes zero all at once, whereupon the drain pin 75 is retreated by the hydraulic pressure within the second high-pressure chamber 78 that overcomes the spring force of the drain spring 74, to open the drain hole 73 for the drainage of oil.

On the contrary, when a predetermined torque is reached in the state of no operation of the thermo-switch, the hydraulic pressure of the first high-pressure chamber 76 overcomes the spring forces of the return springs 69 and 70, so that the limiter pin 60 opens the communication hole 56 for pressure regulation. In consequence, a balance may vary between the hydraulic pressure within the second high-pressure chamber 76 and the combined force of the hydraulic pressure within the first high-pressure chamber 76 and the spring force of the drain spring 74, with the result that the drain pin 75 itself is gradually balanced by the hydraulic pressure, to open the drain hole 73 to thereby drain the oil within the second high-pressure chamber for pressure regulation. The second high-pressure chamber 78 leads to a high-pressure port 86 by way of three high-pressure passages 83, 84 and 85. From the high-pressure port 86 the oil as indicated by an arrow D flows through the high-pressure passages 83, 84 and 85 into the second high-pressure chamber 78.

Figure 1B:
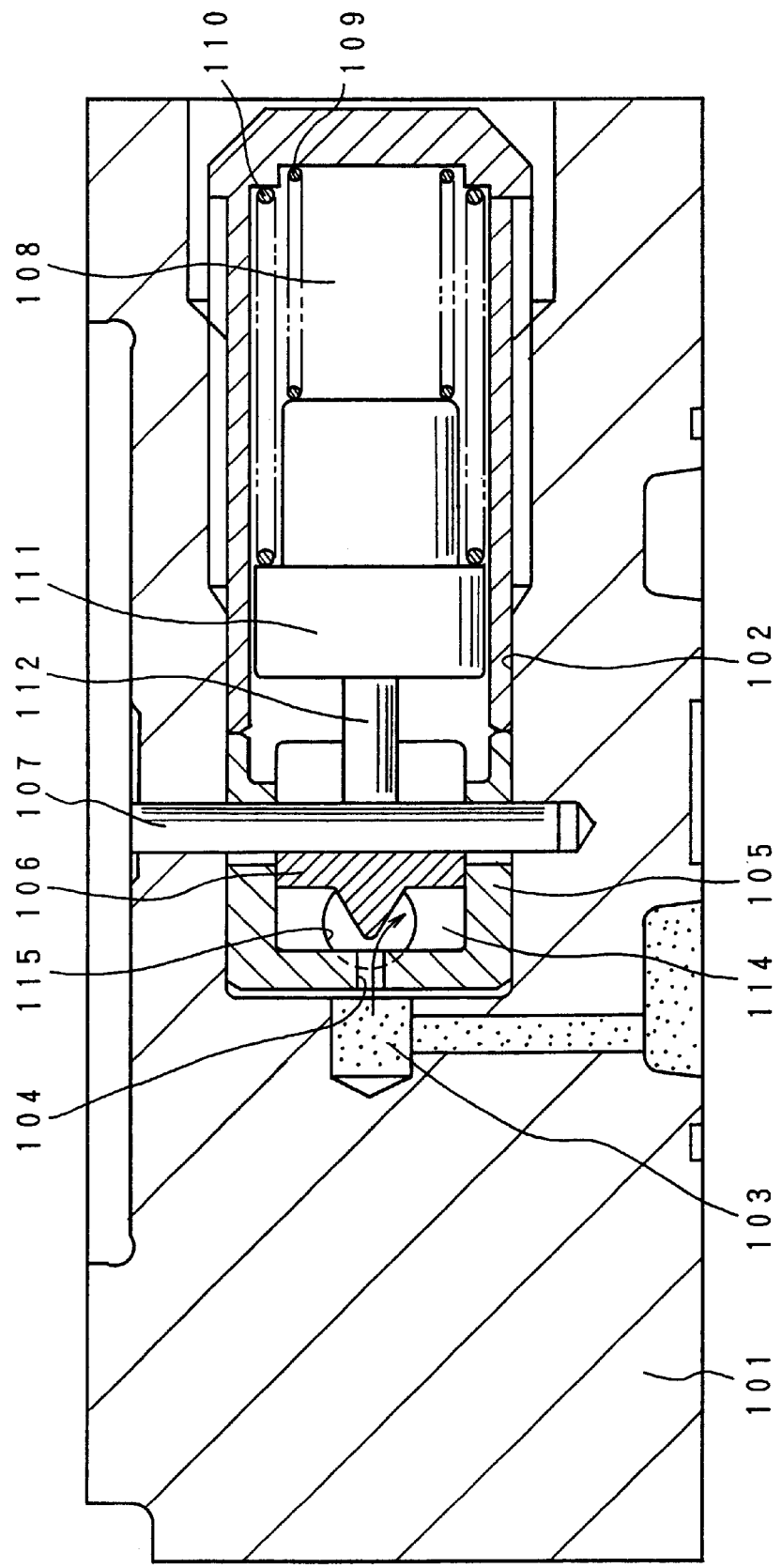
Figure 2A:
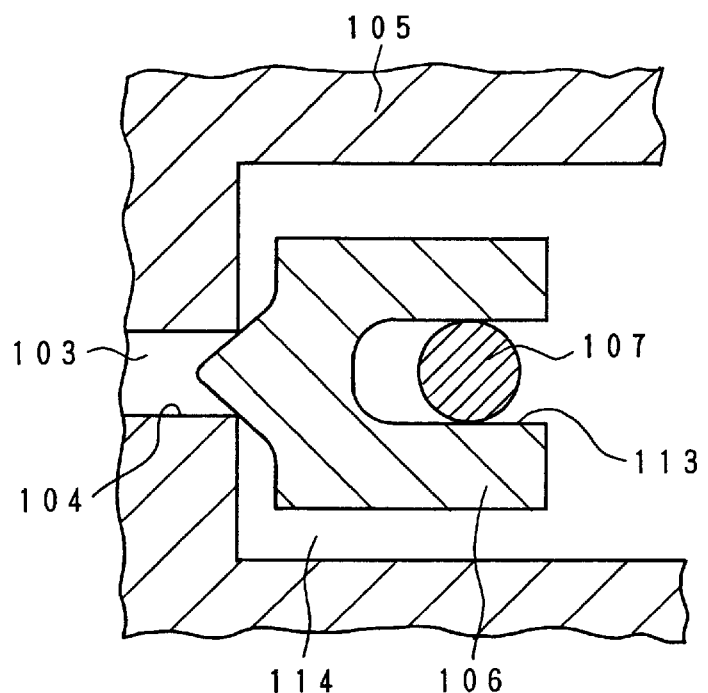
FIGS. 2A and 2B are fragmentary sectional views of a drain pin.
Figure 2B:
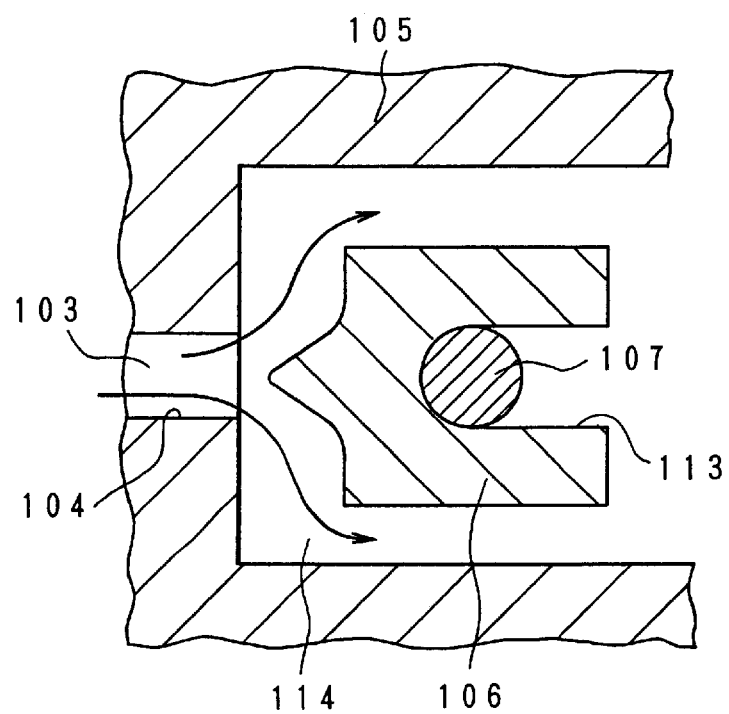
Figure 3:
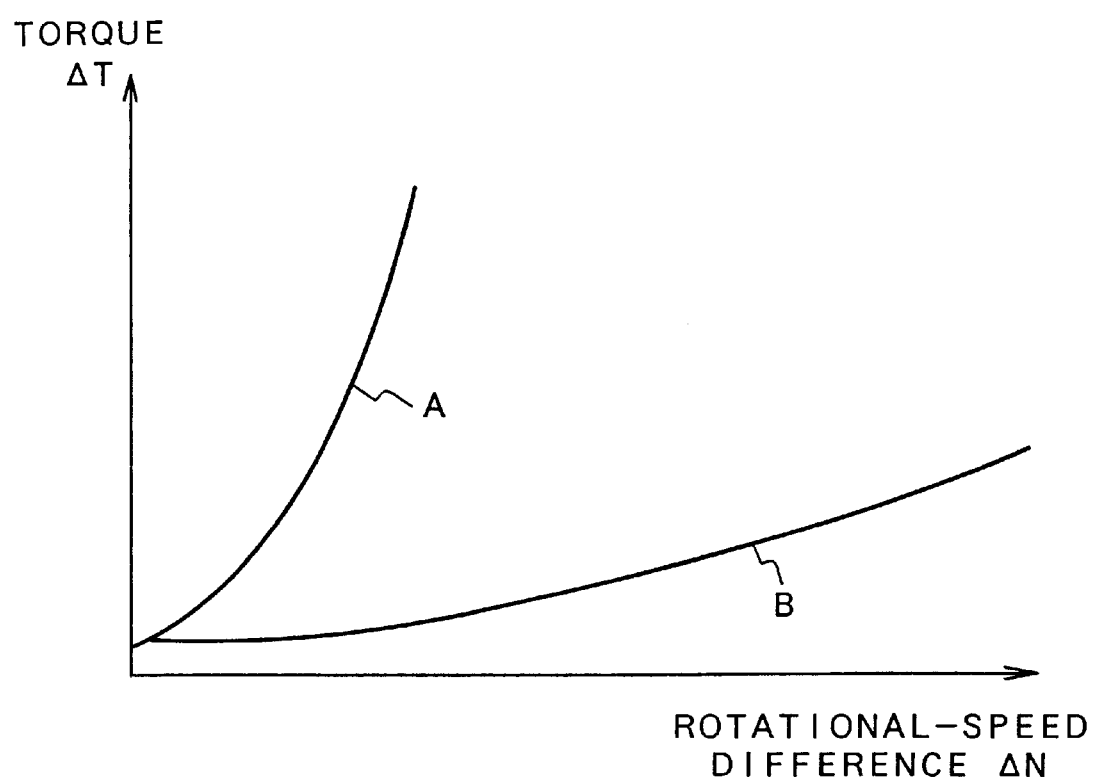
FIG. 3 is a graphic representation of the torque characteristic of the mechanism of FIGS. 1A and 1B.
Figure 7:
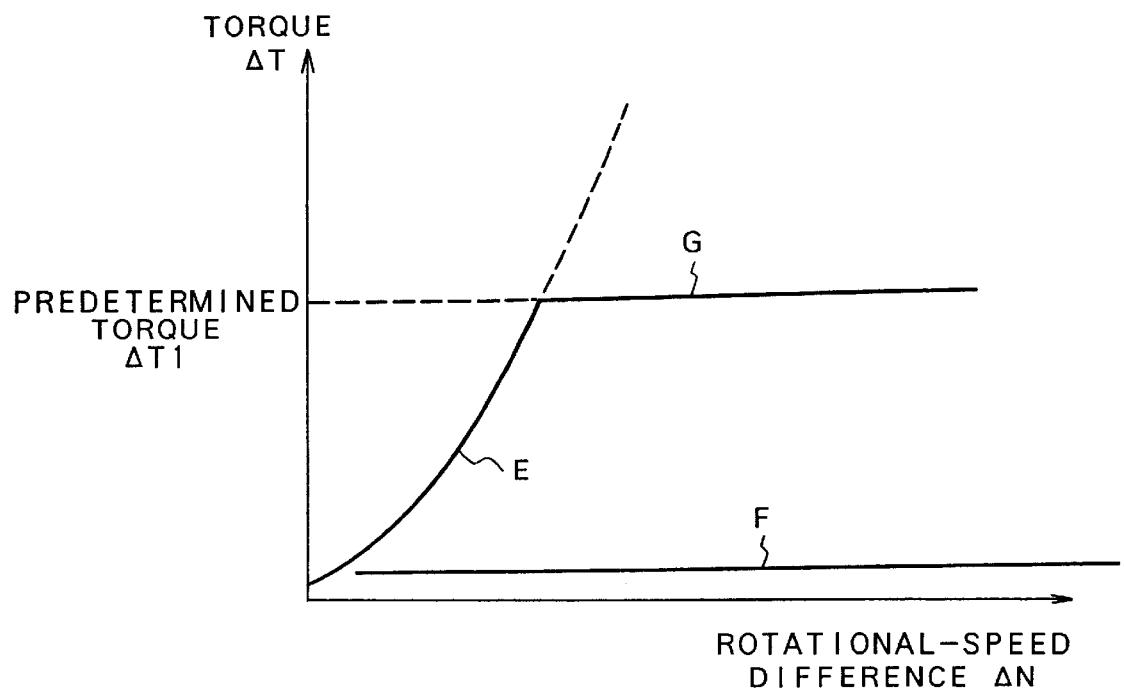
FIG. 7 is a graphic representation of the torque characteristic of the mechanism of FIGS. 5A and 5B.

The operative function will now be described. In the normal status in which the temperature at the thermo-switch 67 does not reach a predetermine level, the hydraulic pressure from the high-pressure port 86 is applied through the high-pressure passages 83, 84 and 85 to the second high-pressure chamber 78 as indicated by the arrow D. The oil within the second high-pressure chamber 78 flows through the communication hole 77 in the drain pin 75 into the first high-pressure chamber 76, and thence passes through the communication hole 56 to act on the limiter pin 60. Accordingly, the same hydraulic level can be maintained within both the first high-pressure chamber 76 and the second high-pressure chamber 78. The return springs 69 and 70 press the limiter pin 60 by way of the thermo-switch 67, with the spring forces of the return springs 69 and 70 being greater than the hydraulic pressure within the first high-pressure chamber 76, to allow the limiter pin 60 to block the communication hole 56. The drain pin 75 is urged leftward by the drain spring 74 and by the hydraulic reaction force of the first high-pressure chamber 76, to block the drain hole 73. The hydraulic pressure is thus sealed. On the contrary, after entering the first high-pressure chamber 76, the hydraulic pressure is applied through the orifice 80 and, from the drain chamber 81 via the drain passage 82 into the low-pressure chamber as indicated by the arrow C. The torque characteristic during normal operation is shown by the characteristic E of FIG. 7 in which a torque $\Delta T$ is acquired that is proportional to the square of the rotational-speed difference $\Delta N$. When the temperature at the thermo-switch 67 reaches a predetermined level, the head pin 71 of the thermo-switch 67 is extended leftward to abut against the fixed pin 54, as shown in FIG. 5B, with the resultant reaction force causing the thermo-switch 67 to retreat rightward against the return springs 69 and 70. This cuts off the force pressing the limiter pin 60 to compulsorily relieve the limiter pin 60. When the communication hole 56 is opened as a result of retreat of the limiter pin 60, the hydraulic pressure within the drain chamber 64 is drained through the drain passage 71 into the low-pressure chamber 66, nullifying the hydraulic pressure within the first high-pressure chamber 76 in the drain pin 75 all at once. For this reason, the drain pin 75 is retreated by the hydraulic pressure within the second high-pressure chamber 78 that exceeds the spring force of the drain spring 74, to open the drain hole 73 for the drainage of oil. The torque characteristic at that time is substantially zero as seen in the characteristic F of FIG. 7. Thus, even though the predetermined temperature is reached, as seen in the characteristic B of FIG. 3, the torque $\Delta T$ will not increase accordingly as the rotational-speed difference $\Delta N$ increases, due to the insufficient drain capability.

Then, when a predetermined torque is reached in the pre-operation status of the thermo-switch, the balance between the hydraulic pressure within the first high-pressure chamber 76 and the biasing forces of the return springs 69 and 70, with the result that the hydraulic pressure within the first high-pressure chamber 76 acting on the limiter pin 60 overcomes the spring forces of the return springs 69 and 70, allowing the limiter pin 60 to open the communication hole 56, for pressure regulation to catch a balance there between. The balance thereby varies between the hydraulic pressure within the second high-pressure chamber 78 and the combined force of the hydraulic pressure within the first high-pressure chamber 76 and the spring force of the drain spring 74. In this case, the hydraulic pressure within the second high-pressure chamber 78 overcomes the combined force of the hydraulic pressure and the spring force of the drain spring 74, allowing the drain pin 75 to gradually open the drain hole 73. In this manner, the drain pin 75 itself gradually catches a hydraulic balance while draining the oil. The torque characteristic at that time can keep a constant value in case a predetermined torque $\Delta T1$ is exceeded, as seen in the characteristic G of FIG. 7. In this way, the drain pin 75 itself can operate by hydraulic balance and keep a certain torque $\Delta T$. In addition, it further functions not only as the temperature-based 4 wheel-drive to 2 wheel-drive switching mechanism but also as the torque limiter.

It will be appreciated that the present invention is not limited to the above embodiment and that it includes any appropriate variants insofar as they do not impair the objects and advantages thereof. The present invention is not intended to be restricted by the numerical values shown in the above embodiment.

What is claimed is:

1. A drain mechanism for a hydraulic power transmission joint adapted to be interposed between an input shaft and an output shaft that are rotatable relative to each other, to transmit torque as a function of the rotational-speed difference between said input and output shafts, said drain mechanism comprising:

a limiter plug accommodated within a valve block and having a communication hole through which oil is introduced from a first high-pressure chamber;

a thermo-switch located within a low-pressure chamber in said valve block in such a manner as to be urged by a return spring, said thermo-switch having a head pin that protrudes when a predetermined temperature is reached;

a fixed pin fixedly inserted into said valve block, said fixed pin being positioned so as to allow said head pin of said thermo-switch urged by said return spring to abut thereagainst, said fixed pin when said head pin protrudes at said predetermined temperature causing said thermo-switch to retreat against said return spring;

a limiter pin slidably located within said limiter plug, said limiter pin being pressed by said thermo-switch to close said communication hole for the duration in which said predetermined temperature is not reached, said limiter pin when said predetermined temperature is reached, opening said communication hole as a result of cutoff of the pressing force induced by a retreat of said thermo-switch, said limiter pin when a predetermined torque is reached, opening said communication hole by a high pressure from said first high-pressure chamber;

a drain plug that follows said limiter plug, accommodated in said valve block, said drain plug having a drain hole through which oil is discharged from a second high-pressure chamber; and a drain pin slidably located within said drain plug in such a manner as to be urged by a drain spring, said drain pin having said first high-pressure chamber into which oil is introduced from said second high-pressure chamber and which opens to said communication hole, said drain pin closing said drain hole by means of a pressing force of said limiter pin until a predetermined temperature is reached, said drain pin rapidly opening said drain hole in response to a retreat of said limiter pin effected when said predetermined temperature is reached, said drain pin when a predetermined torque is reached for the duration in which said predetermined temperature is not yet reached, opening said drain hole while adjusting its balance so as to keep said predetermined torque.

2. A drain mechanism according to claim 1, wherein said drain pin includes an orifice by way of which said first high-pressure chamber located in an interior of said drain pin can communicate with a low pressure side located in an exterior thereof.

3. A drain mechanism according to claim 1, wherein it functions also as a torque limiter by reducing the difference between a pressure receiving area associated with said second high-pressure chamber of said drain pin and a pressure receiving area associated with said first high-pressure chamber in the status where a predetermined temperature is not yet reached and said thermo-switch is out of action.

4. A drain mechanism according to claim 3, wherein the ratio of area of said pressure receiving area associated with said first high-pressure chamber of said drain pin to said pressure receiving area associated with said second high-pressure chamber is about 1.1 or less.

5. A drain mechanism according to claim 1, wherein said hydraulic power transmission joint comprises:

a housing coupled to said input shaft and having a cam face formed on its inner side surface;

a rotor coupled to said output shaft and being rotatably accommodated in said housing, said rotor having a plurality of axially extending plunger chambers;

a plurality of plungers each being reciprocatively accommodated in each of said plurality of plunger chambers under a biasing force of said return spring, said plurality of plungers being operated by said cam face upon the relative rotations of said input and output shafts; and a discharge hole formed in said rotor and opening to said plurality of plunger chambers; wherein said valve block is coupled to said rotor so that oil discharged by the operation of said plungers induces a reaction force in said plungers due to a flow resistance upon passage through an orifice provided in said valve block, to thereby transmit torque between said housing and said rotor.

* * * * *